United States Patent [19]

Bertin et al.

[11] Patent Number: 5,626,911

[45] Date of Patent: May 6, 1997

[54] METHOD FOR THE PRE-TREATMENT OF COATED GLASSES BEFORE HEAT TREATMENT

[76] Inventors: Aulis Bertin, Hauvola, Harjavalta, Finland, 29200; Yrjö Välimäki, Salmentie 5 D, Alavus, Finland, 63300

[21] Appl. No.: 356,223

[22] PCT Filed: Jun. 11, 1993

[86] PCT No.: PCT/FI93/00255

§ 371 Date: Feb. 15, 1995

§ 102(e) Date: Feb. 15, 1995

[87] PCT Pub. No.: WO93/25487

PCT Pub. Date: Dec. 23, 1993

[30] Foreign Application Priority Data

Jun. 15, 1992 [FI] Finland ................... 922754

[51] Int. Cl.⁶ .................. B05D 5/12; C03C 17/23; C03C 19/00
[52] U.S. Cl. .............. 427/271; 427/287; 427/383.5; 65/60.5; 65/61
[58] Field of Search ................ 427/271, 272, 427/276, 284, 287, 282, 357, 383.5, 444; 65/60.5, 61

[56] References Cited

U.S. PATENT DOCUMENTS

| | | | |
|---|---|---|---|
| 3,843,472 | 10/1974 | Toussaint | 65/61 |
| 4,240,816 | 12/1980 | McMaster et al. | 65/60 R |
| 4,300,934 | 11/1981 | DeTorre | 65/60.1 |

FOREIGN PATENT DOCUMENTS 4109709  3/1992  Germany.

Primary Examiner—Shrive Beck
Assistant Examiner—Fred J. Parker
Attorney, Agent, or Firm—Merchant, Gould, Smith, Edell, Welter & Schmidt, P.A.

[57] ABSTRACT

The invention relates to a method for the pre-treatment of coated glasses by removing the coating (2) from the edge areas (4) of the glass plate (1) and bevelling the areas from which the coating has been removed before heat treatment.

4 Claims, 4 Drawing Sheets

| 2,1 | 1,5 | 1,3 | 1,4 | 1,3 | 1,3 | 1,4 | 1,4 | 1,2 | 1,6 |
|---|---|---|---|---|---|---|---|---|---|
| 1,5 | 1,1 | 1,1 | 1,1 | 1,0 | 1,0 | 1,0 | 1,0 | 1,0 | 1,3 |
| 1,3 | 1,1 | 1,1 | 1,1 | 1,0 | 1,0 | 1,1 | 1,0 | 1,1 | 1,3 |
| 1,3 | 1,1 | 1,1 | 1,2 | 1,1 | 1,0 | 1,0 | 1,0 | 1,0 | 1,3 |
| 1,2 | 1,1 | 1,1 | 1,2 | 1,1 | 1,1 | 1,1 | 1,2 | 1,2 | 1,5 |
| 1,2 | 1,0 | 1,0 | 1,1 | 1,1 | 1,2 | 1,2 | 1,2 | 1,3 | 1,6 |
| 1,2 | 1,0 | 1,0 | 1,0 | 1,0 | 1,0 | 1,1 | 1,2 | 1,3 | 1,3 |
| 1,3 | 1,0 | 1,0 | 1,0 | 1,0 | 1,0 | 1,1 | 1,2 | 1,3 | 1,8 |
| 1,3 | 1,1 | 1,1 | 1,1 | 1,1 | 1,1 | 1,1 | 1,1 | 1,2 | 1,6 |
| 1,8 | 1,2 | 1,3 | 1,2 | 1,3 | 1,3 | 1,3 | 1,4 | 1,6 | 2,7 |

FIG. 1

| | | | | | | | | | |
|---|---|---|---|---|---|---|---|---|---|
| 1,2 | 1,2 | 1,2 | 1,2 | 1,2 | 1,1 | 1,1 | 1,2 | 1,2 | 1,2 |
| 1,1 | 1,1 | 1,0 | 1,1 | 1,1 | 1,0 | 1,0 | 1,1 | 1,1 | 1,1 |
| 1,2 | 1,2 | 1,1 | 1,1 | 1,2 | 1,1 | 1,0 | 1,0 | 1,0 | 1,1 |
| 1,2 | 1,2 | 1,2 | 1,2 | 1,1 | 1,1 | 1,1 | 1,1 | 1,1 | 1,1 |
| 1,1 | 1,1 | 1,0 | 1,0 | 1,0 | 1,0 | 1,0 | 1,0 | 1,0 | 1,1 |
| 1,1 | 1,1 | 1,1 | 1,0 | 1,0 | 1,0 | 1,1 | 1,1 | 1,0 | 1,1 |
| 1,1 | 1,1 | 1,1 | 1,1 | 1,1 | 1,0 | 1,0 | 1,1 | 1,1 | 1,1 |
| 1,1 | 1,0 | 1,2 | 1,0 | 1,0 | 1,1 | 1,0 | 1,0 | 1,1 | 1,2 |
| 1,1 | 1,1 | 1,1 | 1,0 | 1,0 | 1,0 | 1,0 | 1,1 | 1,1 | 1,2 |
| 1,2 | 1,1 | 1,1 | 1,1 | 1,0 | 1,0 | 1,1 | 1,1 | 1,1 | 1,2 |

FIG. 2

METHOD FOR THE PRE-TREATMENT OF COATED GLASSES BEFORE HEAT TREATMENT

CROSS REFERENCES TO RELATED APPLICATIONS

This application is related to PCT Application No. PCT/FI93/00255, filed Jun. 11th, 1993, which claims priority from Finnish Application No. 922754, filed Jun. 15, 1992.

Background of the Invention

1. Field of the Invention

This invention relates to a method for the pretreatment of coated glasses before heat treatment. In the heat treatment the glass plate is heated and then cooled preferably by air jets.

2. Description of the Prior Art

As is well-known, the resistance of glasses to various strains can be increased by thoroughly heating the glass up to a temperature ranging from 580° C. to 700° C. and then cooling it rapidly by air jets directed to its surfaces. The temperature of the upper and lower surfaces of the glass plate drops more rapidly than that of the interior of the glass plate. As a result, the surfaces of the glass plate solidify earlier than the interior of the glass. When the surface temperatures decrease, the surfaces tend to shrink. The interior of the glass plate prevents the shrinking of the solidified surface portions. As the interior of the glass has not solidified, it tends to stretch. As a result, there is a compression stress state on the surface and a tensile stress state in the interior.

The strength properties of glass plates depend on the differences between the surface and interior stresses. With sufficient stress differences, the glass will be provided with safety glass properties. A glass plate heat-treated in this way is known as hardened safety glass. Hardened safety glass has a bending strength about five times higher than that of glasses which have not been heat-treated.

It is typical of hardened safely glasses that they have a bending strength five times higher, a resistance to rapid temperature changes ten times higher, and an impact strength significantly higher than glasses not treated by heat. If hardened safety glass is broken, small roundish pea-size lightweight pieces are formed which are not injurious to people.

A further measurable property of hardened safety glasses is the number of pieces formed at breakage within an area of 50 mm$^2$ ×50 mm$^2$ and the shape and size of the pieces. An allowable number of pieces within such an area is between 50 and 400. In a broken plate of hardened glass, none of the pieces must be sharp or have the shape of a dagger blade.

The glass hardening method is widely known. Hardening of a coated glass plate is described in U.S. Pat. No. 4,857, 094.

When stress differences between the surfaces and the interior of the glass plate are smaller than in hardened safety glasses, the glass does not fulfil the requirements made of safety glass. However, the bending strength of such glass is about two times greater than that of glass not treated by heat, and the product is called heat-toughened glass. Similarly as with ordinary glass, large sharp-edged pieces injurious to people are formed at breakage. The production and properties of heat-toughened glass are described in greater detail in U.S. Pat. No. 4,759,788.

When a glass plate is heated to about 700° C., it can be shaped in various known ways. After the glass has been shaped as desired, it is allowed to cool slowly so that no temperature differences causing stress differences are formed between the surfaces and the interior. The glass has strength properties similar the interior. The glass has strength properties similar to those of ordinary glasses. If required, hardened safety glasses and heat-toughened glasses can be normalized by repeating the heat treatment without the cooling air jets. Normalized glasses have strength, temperature resistance and impact strength properties similar to those of untreated glasses.

Hardened and heat-toughened glasses are used when it is assumed that ordinary glasses would not resist the strains to which they will be exposed. Hardened safety glasses are used when the breakage of such glasses would risk the safety of people.

Conditions at the point of installation and the architectural design often require such properties that ordinary glasses have to be coated e.g. by heat-radiation-reflecting layers of metal, metal oxide or their combinations to achieve the desired property. In general, coated glasses are such that they reflect the heat radiation of the sun and the long-wave indoor heat radiation. Glasses reflecting long-wave heat radiation are used to increase the heat resistance of glass structures and to decrease the coefficient of heat passage. Low-emissivity-coated glass plates having properties similar to an electric resistor are used in electrically heated glasses as a heating element.

The production methods of coated glasses, the material layers used in coated glasses and the properties of such layers are described in greater detail in GB Patent Applications 2 116 590; 2 134 444; 2 156 339; and 2 209 176; European Patent Applications 0 275 662; 0 283 923; and 0 301 755; and U.S. Pat. Nos. 4,239,379; 4,462,883; and 4,707,383.

A major disadvantage of the prior art heat-treatment technique for coated glasses is that there occurs temperature differences between the edges and middle areas of the glass plate and between the uncoated and coated glass surface portions, which are due to the fact that coated and uncoated surface portions reflect heat radiation in different ways. As different glass plate portions cool in different ways, the temperature differences and the cooling rate cause stress differences which warp the plate.

This is particularly easily detectable in the edge areas of the glass plate. It is especially problematic in coated glasses where the emissivity is lower than that of ordinary building glass. The problem is further aggravated as the emissivity of coated glasses decreases.

The problem is regarded as especially difficult in hardened and heat-toughened glasses coated with a metal or metal oxides, as such coated glasses contain freely moving electrons. It has been shown by surface resistance measurements that such glasses have a surface resistance between 10 and 50 ohm/square. Measurements carried out after heat treatment show that the surface resistances of glass plates are two or three times greater, i.e. the emissivities of the surfaces have increased, in the edge area. In the middle of the glass plate, the surface resistances increased significantly less.

In coated and hardened glasses heated electrically, changes in the surface resistances within the edge areas have a clearly adverse effect on the uniformity of the surface temperature in the glass plate. The higher surface resistances in the edge areas of low-emissivity-coated glasses increase surface temperatures in the edge area so that they are higher than within other areas. This is a major disadvantage particularly in solid-glass elements as it deteriorates the long-term strength of the elements.

As is well-known, the above-mentioned glasses reflect long-wave heat radiation and they are used in energy-saving window glass panes having a low k value.

An increase in the surface resistances within the edge areas after heat treatment also involves an increase in the emissivity value and a reduction in the ability of the surface to reflect long-wave heat radiation back to the room space, in addition to which the k values and the demand of heating energy are increased.

Stress differences warp the glass plates and make them difficult to install, in addition to which they cause variation in the inner strains and strengths of the glass plates. This problem is particularly severe in hardened safety glasses, which have to meet high strength requirements. There are considerable strength differences in coated hardened glasses, especially in their edge areas. Strength differences deteriorate the strength of hardened, heat-toughened and shaped glasses, thus limiting their use for safety reasons.

SUMMARY OF THE INVENTION

The method according to the invention for the pre-treatment of coated glasses provides a decisive improvement with respect the above disadvantages. To achieve this, the coated glass is pre-treated according to the invention before heat treatment by removing the coating layer from the edge area of the glass plate.

A major advantage of the invention is that the coated surfaces of the glass plates cool more evenly during the cooling step. The warping of the surfaces is reduced substantially; the strength differences between the different portions of the glass plate are levelled out; and the heat-radiation reflecting properties and surface resistances in low-emissivity-coated glasses change significantly less. Coated heat-treated glasses, the use of which is not limited by any doubts about their safety and unfavourable changes in their properties.

Another advantage of the invention is that as the warping is reduced, the optical quality of coated heat-treated glasses is improved. In particular, this advantage is of high importance in mirror-reflection glasses in which even a minor warp causes easily detectable optical distortions.

BRIEF DESCRIPTION OF THE DRAWING

In the following the invention will be described in detail with reference to the attached figures.

FIG. 1 illustrates relative surface resistances in hardened low-emissivity-coated glass.

FIG. 2 illustrates relative surface resistances in hardened low-emissivity-coated glass pretreated according to the invention.

DESCRIPTION OF THE PREFERRED EMBODIMENT

FIG. 1 illustrates the distribution of measured surface resistances in a square low-emissivity coated, hardened glass plate. Within the edge area of the glass plate the surface resistances are considerably greater than before the heat treatment, and the differences between the edge areas and the middle portion are significant. FIG. 2 illustrates the distribution of measured surface resistances in a square low-emissivity-coated hardened glass plate produced in similar conditions after heat treatment when the glass has been pre-treated according to the invention. Changes in the surface resistances within the edge areas of the glass plate are small, and the differences between the edge area and the middle area are insignificant.

Figure 3:
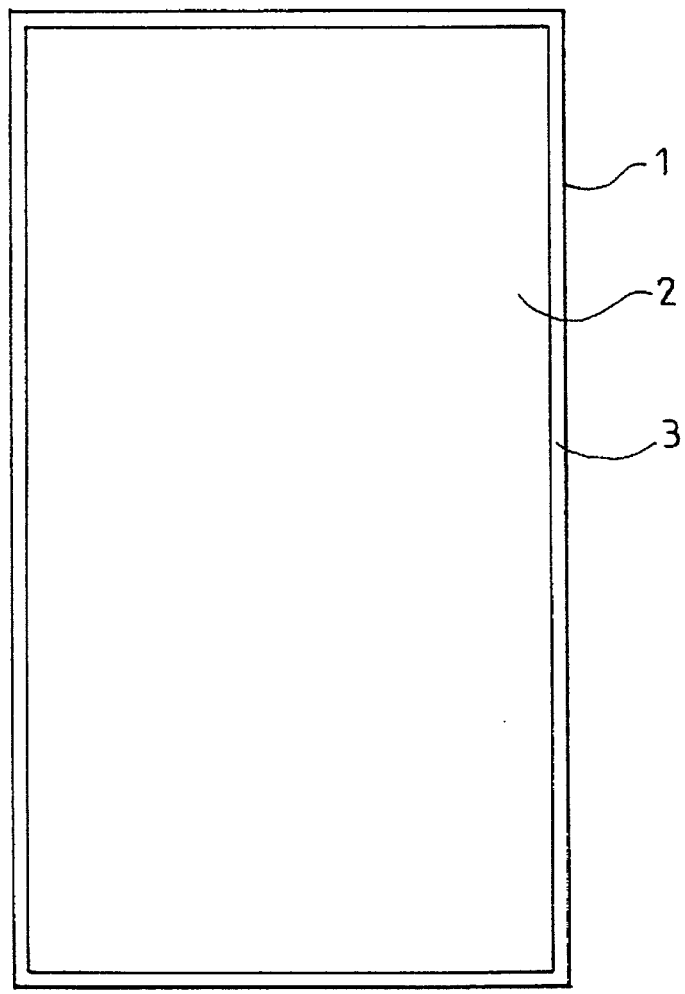
FIG. 3 illustrates a pre-treated coated glass plate according to the invention.
Figure 4:
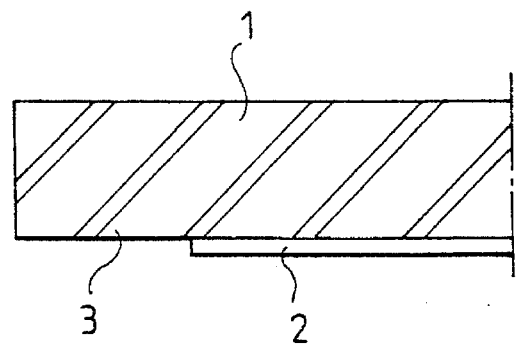
FIG. 4 is a sectional view of the edge area of the coated glass shown in FIG. 3.

FIG. 3 shows a coated glass plate 1 according to the invention, comprising a coated area 2 and an edge area 3 from which the coating has been removed. FIG. 4 is a sectional view of the edge area of the coated glass according to the invention shown in FIG. 3, which shows the coated glass plate area 2 and the edge area 3 from which the coating has been removed.

Figure 5:
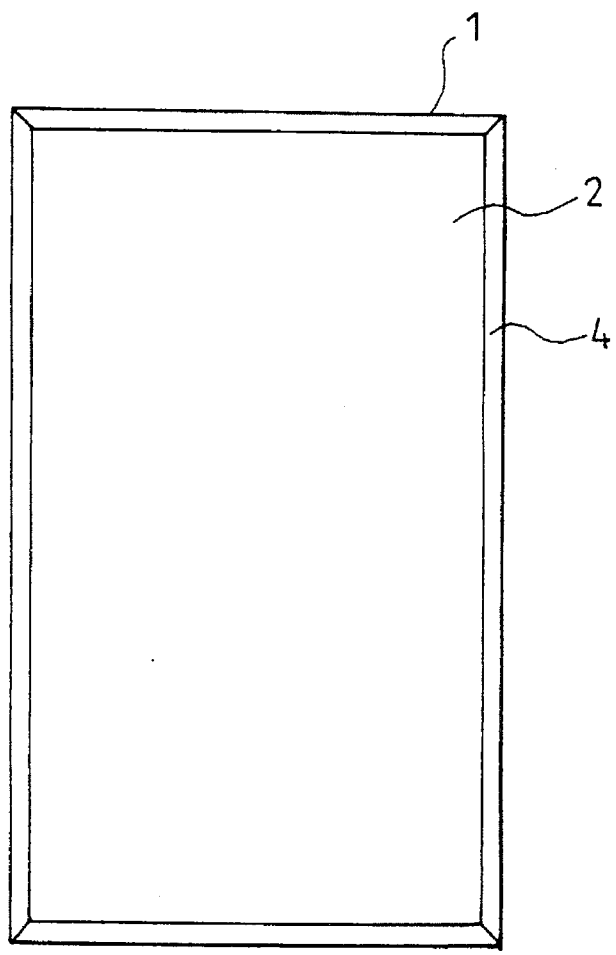
FIG. 5 shows a low-emissivity-coated glass plate according to the invention.
Figure 6:
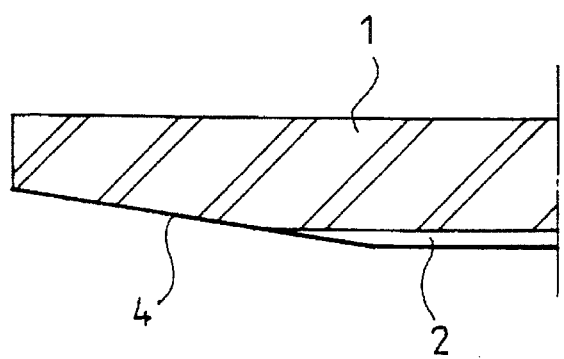
FIG. 6 is a sectional view of the edge area of the low-emissivity-coated glass shown in FIG. 5.

FIG. 5 shows a low-emissivity-coated hardened glass plate 1 according to the invention, a coated area 2 and an area 4 from which the coating has been removed. In the method according to the invention the edges of the coated glass are bevelled by removing part of the glass in addition to the coating so as to achieve the desired properties. FIG. 6 is a sectional view of the edge area of the hardened low-emissivity-coated glass plate according to the invention shown in FIG. 5, in which the coating 2 has been removed from the glass plate 1 within the area 4, and the edge of the glass has been shaped to achieve the desired properties.

In particular, it is to be noted that the pre-treatment according to the invention can be applied to all plates to be heat-treated and comprising a separate heat-radiation reflecting coating layer. It is further to be noted that the invention has been described above with reference to two examples. However, the intention is by no means to limit the invention to these particular examples but many modifications are possible within the inventive idea defined in the following claims.

We claim:

1. A method for treating a coated glass plate before heat treatment, the coated glass plate having an edge area parallel to the plane of the glass plate and further having a resistive, heat radiation reflecting coating layer over at least the edge area of the glass plate, the coating layer containing conduction electrons, the heat treatment including heating the glass plate to an elevated temperature ranging from 580° C. to 700° C., cooling the glass plate rapidly so as to produce surface compression stresses on the glass plate and interior tensile stresses in the glass plate, the method comprising removing an edge part of the coating layer from the edge area of the glass plate to produce an uncoated portion of the glass plate before the heat treatment, so as to maintain a substantially uniform resistivity across the glass plate when cooling from the elevated temperature.

2. The method according to claim 1, wherein the removing step comprises beveling the edge portion of the glass plate with respect to the plane of the coating so as to produce an uncoated beveled portion of the glass plate.

3. A method of treating a glass plate having an edge area and an electrically resistive coating disposed on a surface of the glass plate, the electrically resistive coating having a surface resistivity, the method comprising the step of removing the electrically resistive coating from the surface at a peripheral edge area of the glass plate so as to maintain a substantially uniform surface resistivity following a subsequent heat treatment step in which a temperature of the glass plate ranges from 580° C. to 700° C.

4. The method of claim 3, wherein the surface resistivity of the resistive coating ranges from 10 Ohms per square to 50 Ohms per square.

* * * * *